United States Patent Office 3,117,131
Patented Jan. 7, 1964

---

3,117,131
METHOD FOR PRODUCING INDOLINE-6-SULFONAMIDES
Hermann Breuer and Hans Hoehn, Regensburg, Germany, assignors to Olin Mathieson Chemical Corporation, New York, N.Y., a corporation of Virginia
No Drawing. Filed May 29, 1962, Ser. No. 198,460
Claims priority, application Germany June 29, 1961
7 Claims. (Cl. 260—319)

This invention relates to a method for the production of indoline-6-sulfonamides and for intermediates therefor. More particularly the invention relates to an improved method for producing indoline-6-sulfonamide of the following formula (I)

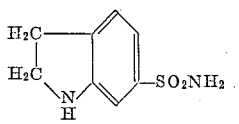

and to 1-acyl derivatives thereof.

The method hitherto disclosed of converting N-acetylindoline into its sulfonyl chloride, converting the sulfonyl chloride into the sulfonamide and then removing the acetyl group with dilute sodium hydroxide is best suited for the production indoline-5-sulfonamide.

It has now been found that indoline-6-sulfonamide can be prepared in high yield from 3-amino-4-($\beta$-haloethyl)-benzenesulfonamide by cyclization. This novel intermediate is derived from 3-nitro-4-($\beta$-haloethyl)benzenesulfonamide by reduction. The overall process is indicated by the following flow diagram:

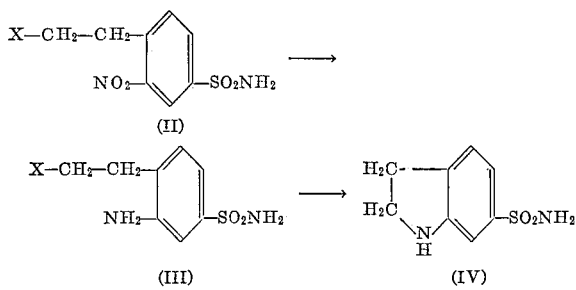

X in the above formulas represents any of the four halogens of which chlorine and bromine are preferred, especially the former.

According to this invention a 4-($\beta$-haloethyl)benzenesulfonyl chloride of the formula (V)

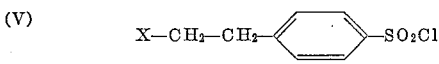

wherein X represents halogen, is nitrated to form the 3-nitro-4-($\beta$-haloethyl)benzenesulfonyl chloride of the formula (VI)

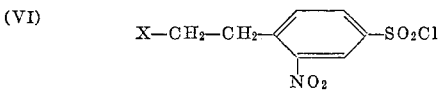

and this in turn is converted to the compound of Formula II by amination, e.g. with ammonia.

The nitration may be effected with concentrated potassium nitrate preferably in the presence of a dehydrating agent such as concentrated sulfuric acid. A solution of potassium nitrate in concentrated sulfuric acid is preferable. The nitration may be carried out at room temperature or slightly above. A temperature of about 30 to 40° C. should not be exceeded. It is not essential to use a pure 4-($\beta$-haloethyl)benzenesulfonyl halide as starting material. The crude reaction product resulting from the sulfohalogenation of a $\beta$-haloethylbenzene may be used equally well without affecting the yield of the 3-nitro-4-($\beta$-haloethyl)benzenesulfonyl halide.

The crude sulfonyl halide, which is obtained from the nitration reaction mixture with ice water, need not be isolated in pure form for conversion to the sulfonamide. It may, however, be purified by recrystallization, if desired. This product is then converted into the corresponding benzenesulfonamide, for example, by reaction with aqueous ammonia.

In the next step of the process the nitro group of the 3-nitro-4-($\beta$-haloethyl)benzenesulfonamide is converted into an amino group. Preferred is the catalytic hydrogenation in the presence of a hydrogenation catalyst especially metals of group VIII of the periodic system, but other known methods of reducing the nitro group to an amino group may also be used.

Since the 3-nitro-4-($\beta$-haloethyl)benzenesulfonamides are only slightly soluble in the conventional solvents, they are preferably used in the form of a suspension, e.g. in lower aliphatic alcohols or esters thereof with lower fatty acids. During the course of the hydrogenation, they go into solution. The temperature should not exceed 30°.

The 3-amino-4-($\beta$-haloethyl)benzenesulfonamide is obtained in practically quantitative yield. 3-amino-4-($\beta$-chloroethyl)benzenesulfonamide, which is preferred, is stable at room temperature. It may be recrystallized from isopropanol. For the next step of ring closure to form the indoline-6-sulfonamide, purification of this intermediate is not essential.

The 3-amino-4-($\beta$-haloethyl)benzenesulfonamide is readily converted into a salt of indoline-6-sulfonamide by heating at an elevated temperature e.g. about 100° C. and splitting off hydrogen halide. It is preferable to effect the cyclization in the presence of an acid binding agent, e.g. an alkali metal hydroxide. For example, 3-amino-4-($\beta$-chloroethyl)benzenesulfonamide is dissolved in dilute sodium hydroxide and the solution is heated to about 90 to 100°. Upon acidification with dilute acetic acid, this solution yields indoline-6-sulfonamide in pure form and in excellent yield.

It is not particularly necessary to effect the formation of indoline-6-sulfonamide in two separate reaction steps. This compound may be obtained directly from the 3-nitro-4-($\beta$-halethyl)benzenesulfonamide by catalytically hydrogenating the latter with Raney nickel at room temperature in the presence of acid binding agents. Under these conditions, hydrogenation of the nitro group and the ring closure to form the indoline nucleus occur simultaneously.

The indoline-6-sulfonamide may be readily acylated on the ring nitrogen under mild conditions without affecting the sulfonamide group. For example, by acylating with acetic anhydride at room temperature, 1-acetylindoline-6-sulfonamide is obtained in almost quantitative yield.

In order to produce 1-acylindoline-6-sulfonamides it is not necessary to use indoline-6-sulfonamide as a starting material. It is also possible to obtain the same products by treating 3-amino-4-($\beta$-haloethyl)benzenesulfonamide with an acylating agent, such as organic acid anhydrides. Acylation and ring closure then occur simultaneously. If the hydrogenation of the 3-nitro-4-($\beta$-haloethyl)benzenesulfonamide is carried out in the presence of an acylating agent 1-acylindoline-6-sulfonamide is obtained directly. In this case the sulfonamide group may also be acylated.

The products of this invention are useful as intermediates for the production of indoline-6-sulfonylureas which are useful as antidiabetic agents. The therapeutically useful products are obtained from the intermediates, for example by reaction in the form of an alkali metal salt with an isocyanic acid derivatives of the formula R—N=C=O wherein R represents a hydrocarbon radical such as alkyl, cycloalkyl, aryl or aralkyl.

The following examples are illustrative of the invention. All temperatures are in degrees centigrade.

*Example 1*

175 grams of 4-(β-chloroethyl)benzenesulfonyl chloride (M.P. 54–56°) are added gradually with vigorous stirring at 20 to 30° to a mixture of 280 grams of anhydrous potassium nitrate and 420 grams of concentrated sulfuric acid. Ice cooling is used to prevent the temperature from exceeding 30°. The reaction mixture is then vigorously stirred at 25 to 30° for an additional 2 hours. The reaction mixture is poured with stirring into a mixture of ice and water whereupon 3-nitro-4-(β-chloroethyl)benzenesulfonyl chloride precipitates. The product is filtered under suction and is washed with water. The damp filtrate residue is introduced with vigorous stirring into an ice cooled mixture of 600 ml. of concentrated ammonia and 600 ml. of water and stirred for another 3 hours. The product, 3-nitro-4-(β-chloroethyl)benzenesulfonamide, is filtered under suction. After drying, 168 grams of crude product are obtained which have a melting point of 165–166°. After recrystallization from ethyl acetate, the M.P. is 166–167°.

*Example 2*

26 grams of 3-nitro-4-(β-chloroethyl)benzenesulfonamide are suspended in 200 ml. of ethyl acetate and, after the addition of Raney nickel catalyst, are hydrogenated at normal pressure and room temperature until no more hydrogen is taken up. Over a period of 60 minutes, 7.4 liters of hydrogen are taken up. The catalyst is then separated by filtration and the solvent is completely distilled off in vacuo. The residue is dissolved in 600 ml. of 0.5 N sodium hydroxide solution and heated on a boiling water bath for one hour. After cooling, the solution is treated with activated charcoal, filtered and the product, indoline-6-sulfonamide, precipitated with dilute acetic acid. 16.6 grams with a M.P. of 169° are obtained. The product may also be recrystallized from dilute ethanol without changing the melting point.

*Example 3*

2.6 grams of 3-nitro-4-(β-chloroethyl)benzenesulfonamide are dissolved in 200 ml. of 0.1 N sodium hydroxide solution and hydrogenated in the presence of Raney nickel catalyst. The hydrogen uptake amounts to 570 ml. and stops after one hour. After separating the catalyst by filtration, the filtrate is concentrated to 50 ml. and acidified with dilute acetic acid. The yield amounts to 0.8 gram of indoline 6-sulfonamide. After recrystallization from 80% ethanol, the M.P. is 165–167°.

*Example 4*

47 grams of indoline 6-sulfonamide are added with stirring to 96 grams of acetic anhydride. The temperature is prevented from exceeding 30° by cooling. The mixture is stirred for one hour, then filtered under suction and the precipitate washed with ether. 54 grams of 1-acetylindoline-6-sulfonamide are obtained melting at 224 to 226°. After recrystallization from 70% ethanol, the substance melts at 225–226°.

*Example 5*

2.3 grams of 3-amino-4-(β-chloroethyl)benzenesulfonamide are mixed with 5 ml. of acetic anhydride while cooling with water. In a short time, 1-acetylindoline-6-sulfonamide crystallizes out. The product is separated by filtration, dissolved in dilute sodium hydroxide solution and reprecipitated with dilute hydrochloric acid. 1.6 grams of product melting at 221 to 223° are obtained. 2.6 grams of 3 - nitro - 4-(β-chloroethyl)benzenesulfonamide in 100 ml. of ethyl acetate and 8 ml. of acetic anhydride are hydrogenated at room temperature in the presence of Raney nickel. The hydrogen uptake is quantitative and stops after one hour. The reaction mixture is separated from the catalyst by filtration and the filtrate is evaporated to dryness. The residue is dissolved in dilute sodium hydroxide solution and 1-acetylindoline-6-sulfonamide is precipitated with dilute acetic acid.

*Example 6*

2.6 grams of 3-nitro-4-(β-chloroethyl)benzenesulfonamide are hydrogenated in 200 ml. of acetic anhydride in the presence of 5 grams of sodium acetate. 1.9 grams of 1-acetylindoline-6-(N-acetyl)sulfonamide are obtained, M.P. 297–300°.

What is claimed is:

1. A process for the production of indoline-6-sulfonamide which comprises reacting 4-(β-haloethyl)benzenesulfonamide with a nitrating agent, catalytically reducing the 3-nitro-4-(β-haloethyl)benzenesulfonamide thus produced to 3-amino-4-(β-haloethyl)benzenesulfonamide and heating the last named product at about 100° C. in the presence of an acid binding agent.

2. A process for the production of indoline-6-sulfonamide which comprises nitrating 4-(β-chloroethyl)benzenesulfonamide with potassium nitrate, catalytically hydrogenating the 3-nitro-4-(β-chloroethyl)benzenesulfonamide thus produced to 3-amino-4-(β-chloroethyl)benzenesulfonamide and heating the last named product at about 100° C. in the presence of sodium hydroxide.

3. A process for the production of indoline-6-sulfonamide which comprises catalytically hydrogenating 3-nitro-4-(β-haloethyl)benzenesulfonamide in the presence of an acid binding agent.

4. A process for the production of indoline-6-sulfonamide which comprises cyclizing 3-amino-4-(β-chloroethyl)benzenesulfonamide by heating in the presence of an acid binding agent.

5. A process for the production of indoline-6-sulfonamide which comprises nitrating 4-(β-chloroethyl)-benzenesulfonyl chloride with potassium nitrate in sulfuric acid to form 3 - nitro - 4-(β-chloroethyl)benzenesulfonyl chloride, reacting the last named compound with ammonia to produce 3-nitro-4-(β-chloroethyl)benzenesulfonamide, catalytically hydrogenating said sulfonamide in the presence of Raney nickel to form 3-amino-4-(β-chloroethyl)benzenesulfonamide and heating the last named compound at about 100° C. in sodium hydroxide.

6. A process as in claim 3 wherein the catalyst is Raney nickel and the acid binding agent is alkali metal hydroxide.

7. A process as in claim 4 wherein the temperature is about 90° to 100° C. and the acid binding agent is alkali metal hydroxide.

References Cited in the file of this patent

UNITED STATES PATENTS

| | | |
|---|---|---|
| 2,794,834 | Randall et al. | June 4, 1957 |
| 2,965,656 | Novello | Dec. 20, 1960 |